United States Patent
Goslee et al.

(10) Patent No.: US 7,328,105 B1
(45) Date of Patent: Feb. 5, 2008

(54) ELECTRONIC COMPASS AND RELATED HEADING FILTER METHOD

(75) Inventors: Nathan V Goslee, Ypsilanti, MI (US); John F Currie, Canton, MI (US); Andrew J Driscoll, Farmington, MI (US)

(73) Assignee: Yazaki North America, Inc., Canton, MI (US)

( * ) Notice: Subject to any disclaimer, the term of this patent is extended or adjusted under 35 U.S.C. 154(b) by 196 days.

(21) Appl. No.: 11/122,110

(22) Filed: May 4, 2005

(51) Int. Cl.
*G01C 21/00* (2006.01)
(52) U.S. Cl. .................. 701/224; 701/207; 340/979
(58) Field of Classification Search ............... 701/207, 701/224; 340/979; 708/300
See application file for complete search history.

(56) References Cited

U.S. PATENT DOCUMENTS

| | | |
|---|---|---|
| 5,090,231 A | 2/1992 | Gallagher |
| 5,333,110 A | 7/1994 | Al-Attar |
| 5,664,335 A | 9/1997 | Suman et al. |
| 5,802,727 A | 9/1998 | Blank et al. |
| 6,539,639 B2 | 4/2003 | Smith |
| 7,152,081 B2 * | 12/2006 | Gremmert .................. 708/300 |

* cited by examiner

*Primary Examiner*—Gertrude A. Jeanglaude
(74) *Attorney, Agent, or Firm*—Harness, Dickey & Pierce, P.L.C.

(57) ABSTRACT

A method for determining a compass heading in a manner that reduces the influence of magnetic noise. The methodology can evaluate changes between various parameters, such as a prior magnetic field parameter and a current magnetic field parameter and/or a prior compass heading parameter and a current compass heading to select an algorithm for use in calculating a new compass heading.

22 Claims, 3 Drawing Sheets

ELECTRONIC COMPASS AND RELATED HEADING FILTER METHOD

INTRODUCTION

The present invention generally relates to electronic compasses and more particularly to an electronic compass having a heading filter that reduces rapid and erratic changes in a calculated compass heading when the electronic compass is operated in a magnetically harsh environment.

Many modern vehicles are equipped with an electronic compass that permits the vehicle occupants to determine the direction in which the vehicle is heading. Generally, these electronic compasses include a magneto-responsive sensor, such as a flux gate sensor, a magneto-resistive sensor, a magneto-inductive sensor, a Hall-effect sensor or the like. The magneto-responsive sensor detects the magnetic field present in the vicinity of the vehicle and processes this signal in order to determine a directional heading of the vehicle relative to the Earth magnetic field.

Signals from magneto-responsive sensors are frequently not "clean" as the output of these sensors is affected by local magnetic anomalies that the vehicle passes or transient magnetic fields that occur within the vehicle. The magnetic noise may manifest itself as "jitter" or "flickering" in which the heading will fluctuate erratically. Accordingly, there remains a need in the art for an improved electronic compass with a heading filter that reduces or eliminates jitter or flickering when the electronic compass is operated in a magnetically harsh environment.

SUMMARY

In one form, the present teachings provide a method for determining a compass heading that can include determining a difference between an angle parameter of a magnetic field vector and a prior value of the compass heading; and selecting an algorithm for determining the compass heading based upon the difference between the angle parameter of the magnetic field vector and the prior value of the compass heading In another form, the present teachings provide a method for determining a compass heading that can include determining a first parameter based at least upon a heading magnitude ($Mh_i$); determining a second parameter based at least upon a heading angle ($Ah_i$); if the first parameter is greater than a positive filter threshold or less than a negative filter threshold, setting a timer to a predetermined timer value; if a current value of the timer is greater than zero, determining a filtered heading based at least partially upon the current value of the timer; and if the current value of the timer is equal to zero, determining the filtered heading based at least partially upon the second parameter and a filter algorithm selected on a basis of a magnitude of the second parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
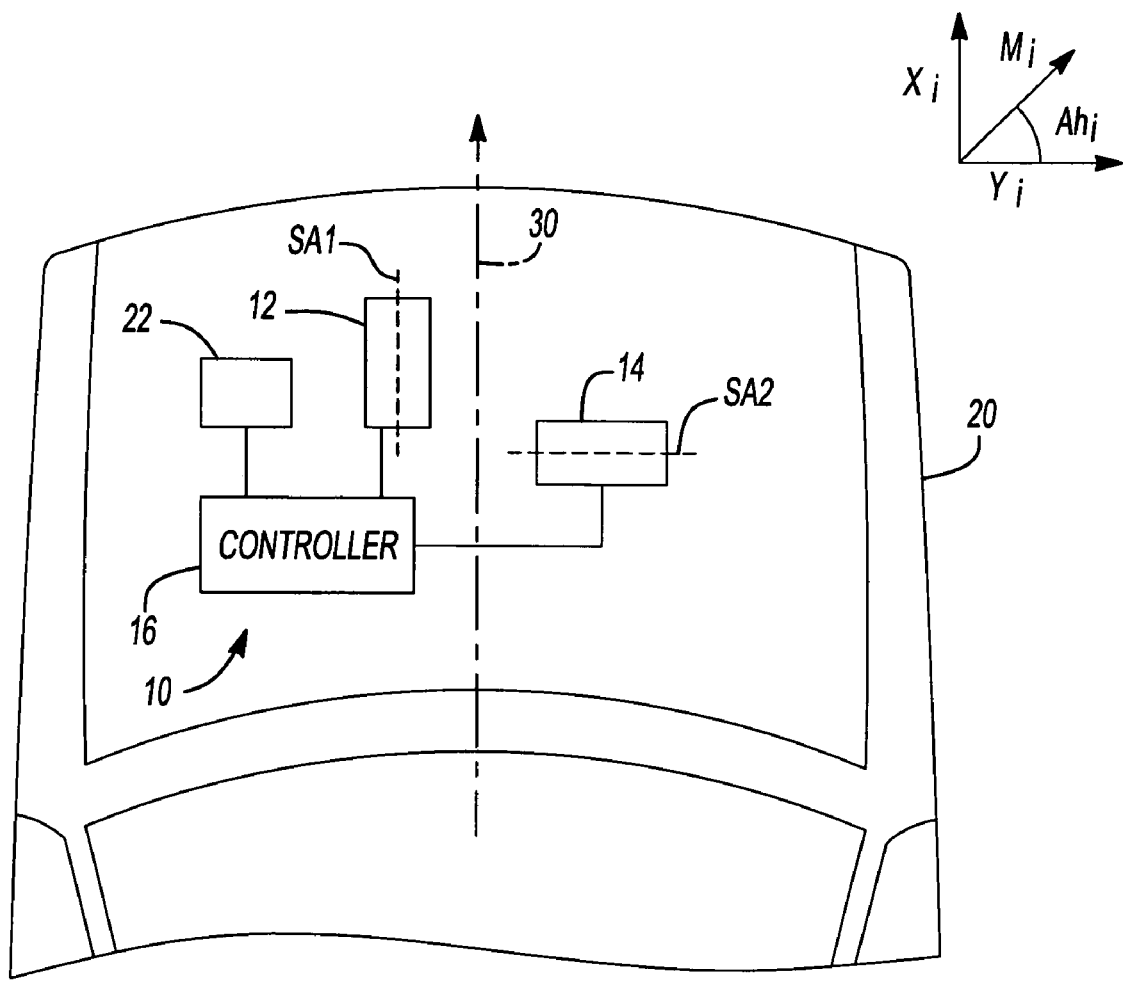
FIG. 1 is a schematic illustration of an electronic compass constructed in accordance with the teachings of the present invention and operatively associated with an automotive vehicle.

With reference to FIG. 1 of the drawings, an electronic compass constructed and operated in accordance with the teachings of the present invention is generally indicated by reference numeral 10. The electronic compass can include a first sensor 12, a second sensor 14 and a controller 16. The electronic compass 10 can produce a heading output that can include a heading direction (e.g., N, NW, W, SW) and/or a heading value, which represents the heading of the electronic compass as expressed numerically (e.g., 45°). In the particular example provided, the electronic compass 10 is operatively associated with an automotive vehicle 20, wherein the electronic compass 10 is housed in an appropriate location, such as between the vehicle roof (not specifically shown) and the vehicle headliner (not specifically shown), and outputs the heading output to a remotely located display 22, which may be located in a vehicle rear view mirror, for example. As those of ordinary skill in the art will appreciate from this disclosure, the display 22 may alternatively be directly coupled to the electronic compass 10.

The first and second sensors 12 and 14 may be any type of sensor for sensing a magnetic field, such as magnetoresistive sensors. Magnetoresistive sensors are well known in the art (see, e.g., U.S. Pat. No. 5,802,727 entitled "Compensation System for Electronic Compass", the disclosure of which is hereby incorporated by reference as if fully set forth herein) and as such, a detailed discussion of their construction and operation need not be provided herein. Briefly, the first and second sensors 12 and 14 are arranged relative to the vehicle 20 in a desired manner, such as with a sensitive axis SA1 of the first sensor 12 generally parallel to a longitudinal axis 30 of the vehicle 20 and a sensitive axis SA2 of the second sensor 14 generally perpendicular to the longitudinal axis 30 of the vehicle 20. Each of the first and second sensors 12 and 14 outputs an X sensor signal and a Y sensor signal, respectively, when the sensor is subjected to a magnetic field that includes the magnetic field of the earth and the magnetic field of the vehicle 20.

The controller 16, which is electronically coupled to the first and second sensors 12 and 14, can receive the X and Y sensor signals and can determine the parameters of a heading vector. The magnetic heading vector can have a heading magnitude $Mh_i$ and a heading angle $Ah_i$ and can be employed to determine the heading output as will be discussed in detail, below.

Figure 2:
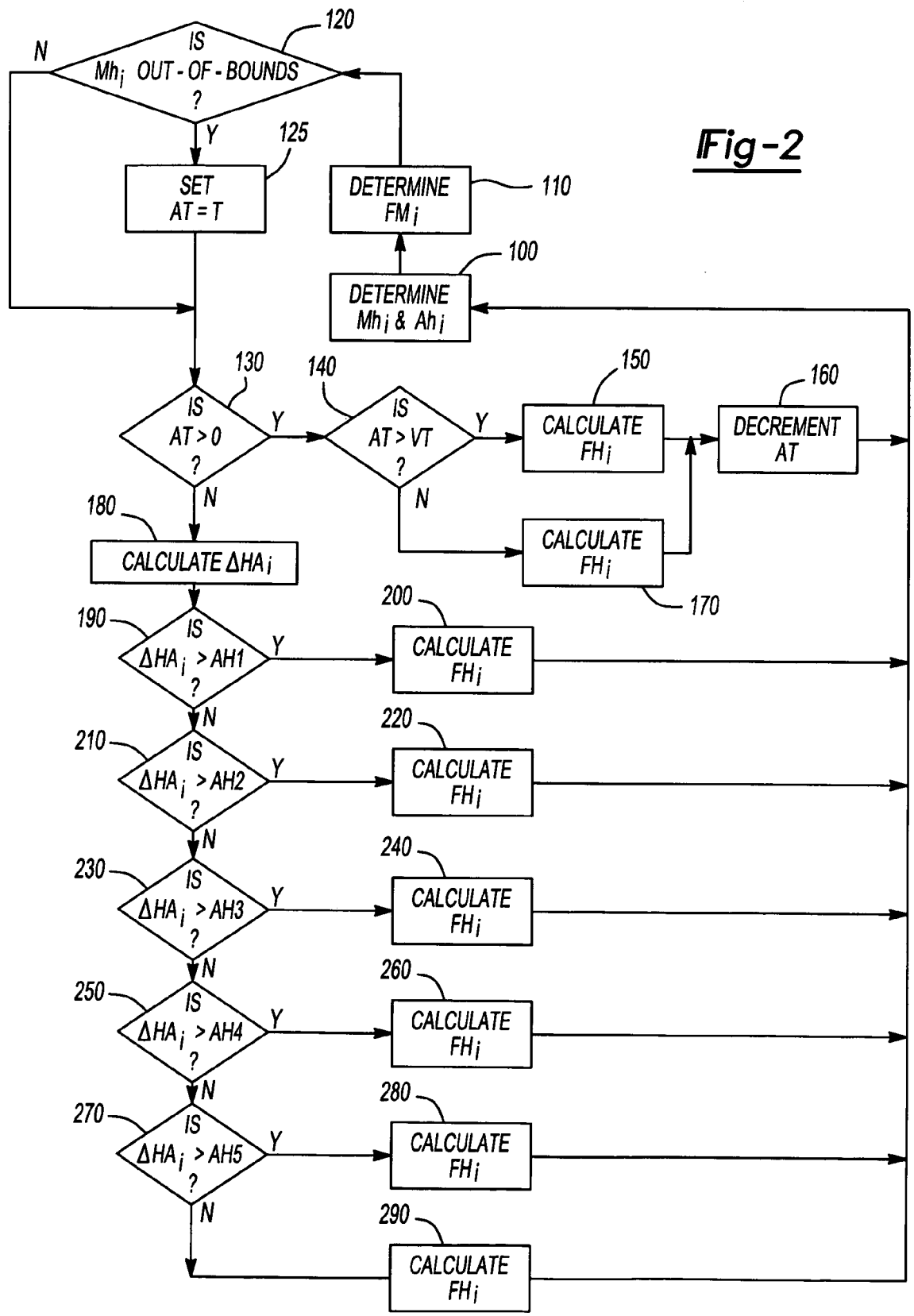
FIG. 2 is a schematic illustration in flow-chart form illustrating the operation of the controller of the electronic compass of FIG. 1.

With reference to FIG. 2, a methodology for the operation of the controller 16 according to the teachings of the present invention is schematically illustrated. The methodology can progress to block 110 where the X and Y sensor signals are employed to determine the heading magnitude Mh and the heading angle Ah. The heading magnitude Mh can be calculated according to the formula:

$$Mh_i = \sqrt{(X_i - X_C)^2 + (Y_i - Y_C)^2}$$

where $Mh_i$ is the heading magnitude at a time (i), $X_i$ is the current value of the X sensor signal, $X_C$ is an X calibration factor, $Y_i$ is the current value of the Y sensor signal, and $Y_C$ is a Y calibration factor. The heading angle Ah can be calculated according to the formula:

$$Ah_i = \tan^{-1}\left(\frac{X_i}{Y_i}\right)$$

The methodology proceeds to block 110.

In block 110, the heading magnitude ($Mh_i$) can be employed to calculate a filtered magnitude ($FM_i$). In the particular example provided, the filtered magnitude ($FM_i$) is calculated according to the formula:

$$FM_i = Mh_i + FM_{(i-1)} - \frac{FM_{(i-1)}}{2^L}$$

where ($FM_{(i-1)}$) is the previous value of the filtered magnitude and (L) is predetermined filtering constant, such as the number 6. It will be appreciated by those of ordinary skill in the art that on start-up FMi may be set to $2^L*Mh_i$ or in the alternative, the methodology can be suppressed (e.g., looped back to block 100) until at least $2^L$ prior values of $FM_n$ have been recorded.

In block 120, the methodology compares the difference between $FM_i$ and $Mh_i$. If the value of $(FM_i)-(Mh_i)$ is greater than a first filter threshold or less than a second filter threshold, the magnitude of the magnetic field vector is out-of-bounds and the methodology proceeds to block 125 where an angle filter timer is set to a predetermined time interval (T) where the value of (T) is greater than zero (0). Thereafter, the methodology can proceed to decision block 130. If the value of $(FM_i)-(Mh_i)$ is not greater than a first filter threshold or less than a second filter threshold in block 120, the methodology can proceed to decision block 130.

In decision block 130, the methodology determines whether the value of the angle filter timer is greater than zero (0). If the value of the angle filter timer is greater than zero (0) the methodology can proceed to decision block 140.

In decision block 140, the methodology determines whether the value of the angle filter timer is greater than a predetermined value ($V_T$). If the value of the angle filter is greater than the predetermined value ($V_T$), the methodology proceeds to block 150.

In block 150, the filtered heading ($FH_i$) can be calculated as follows:

$$FH_i = FH_{(i-1)} + [(Ah_i - FH_{(i-1)}) \times F_1]$$

where $FH_{(i-1)}$ is a prior value of the filtered heading, and $F_1$ is a filtering constant, such as (1/64). Those of ordinary skill in the art will appreciate that upon start-up, the value of $FH_{(i-1)}$ can be set equal to the value of a variable, such as ($Ah_i$). The methodology then proceeds to block 160.

In block 160, the angle filter timer is decremented by a predetermined amount and the methodology loops back to block 100.

Returning to decision block 140, if the value of the angle filter is not greater than the predetermined value ($V_T$), the methodology proceeds to block 170, where the filtered heading ($FH_i$) can be calculated as follows:

$$FH_i = FH_{(i-1)} + [(Ah_i - FH_{(i-1)}) \times F_2]$$

where $F_2$ is a filtering constant, such as (2/64). The methodology then proceeds to block 160.

Returning to decision block 130, if the value of the angle filter timer is not greater than zero (0), the magnitude is within bounds and the methodology proceeds to block 180 where the difference between the heading angle ($Ah_i$) and a previous value of the filtered heading ($FH_{(i-1)}$) can be calculated according to the formula:

$$\Delta HA_i = Ah_i - FH_{(i-1)}$$

where ($\Delta HA_i$) is the magnitude of the change. Those of ordinary skill in the art will appreciate that upon start-up, the value of $FH_{(i-1)}$ can be set equal to the value of a variable, such as ($Ah_i$). The methodology can proceed to decision block 190.

In decision block 190, the methodology determines whether the magnitude of the change ($\Delta HA_i$) is greater than a first threshold (AH1), which may be 75° for example. If the magnitude of the change ($\Delta HA_i$) is greater than the first threshold (AH1), the methodology proceeds to block 200, where the filtered heading angle ($FH_i$) can be calculated according to the formula:

$$FH_i = FH_{(i-1)} + (\Delta HA_i \times AF1)$$

where AF1 is a first angle filter and can be set to a predetermined value, such as (16/64). The methodology can then progress to block 100.

Returning to decision block 190, if the magnitude of the change ($\Delta HA_i$) is not greater than the first threshold (AH1), the methodology can proceed to decision block 210 where the methodology can determine whether the magnitude of the change ($\Delta HA_i$) is greater than a second threshold (AH2), which may be 30° for example. If the magnitude of the change ($\Delta HA_i$) is greater than the second threshold (AH2), the methodology proceeds to block 220, where the filtered heading angle ($FH_i$) can be calculated according to the formula:

$$FH_i = FH_{(i-1)} + (\Delta HA_i \times AF2)$$

where AF2 is a second angle filter and can be set to a predetermined value, such as (18/64). The methodology can then progress to block 100.

Returning to decision block 210, if the magnitude of the change ($\Delta HA_i$) is not greater than the second threshold (AH2), the methodology can proceed to decision block 230 where the methodology can determine whether the magnitude of the change ($\Delta HA_i$) is greater than a third threshold (AH3), which may be 20° for example. If the magnitude of the change ($\Delta HA_i$) is greater than the third threshold (AH3), the methodology proceeds to block 240, where the filtered heading angle ($FH_i$) can be calculated according to the formula:

$$FH_i = FH_{(i-1)} + (\Delta HA_i \times AF3)$$

where AF3 is a third angle filter and can be set to a predetermined value, such as 12°. Alternatively, the third angle filter (AF3) can be a value that can multiplied by the change ($\Delta HA_i$) and the product subsequently added to the previous value of the filtered magnitude. The methodology can then progress to block 100.

Returning to decision block 230, if the magnitude of the change ($\Delta HA_i$) is not greater than the third threshold (AH3), the methodology can proceed to decision block 250 where the methodology can determine whether the magnitude of the change ($\Delta HA_i$) is greater than a fourth threshold (AH4), which may be 10° for example. If the magnitude of the change ($\Delta HA_i$) is greater than the fourth threshold (AH4), the methodology proceeds to block 260, where the filtered heading angle ($FH_i$) can be calculated according to the formula:

$$FH_i = FH_{(i-1)} + (\Delta HA_i \times AF4)$$

where AF4 is a fourth angle filter and can be set to a predetermined value, such as 8°. Alternatively, the fourth angle filter (AF4) can be a value that can multiplied by the change ($\Delta HA_i$) and the product subsequently added to the previous value of the filtered magnitude. The methodology can then progress to block 100.

Returning to decision block 250, if the magnitude of the change ($\Delta HA_i$) is not greater than the fourth threshold (AH4), the methodology can proceed to decision block 270 where the methodology can determine whether the magnitude of the change ($\Delta HA_i$) is greater than a fifth threshold (AH5), which may be 4° for example. If the magnitude of the change ($\Delta HA_i$) is greater than the fifth threshold (AH5), the methodology proceeds to block 280, where the filtered heading angle ($FH_i$) can be calculated according to the formula:

$$FH_i = FH_{(i-1)} + (\Delta HA_i \times AF5)$$

where AF5 is a fifth angle filter and can be set to a predetermined value, such as 4°. Alternatively, the fifth angle filter (AF5) can be a value that can multiplied by the change ($\Delta HA_i$) and the product subsequently added to the previous value of the filtered magnitude. The methodology can then progress to block 100.

Returning to decision block 270, if the magnitude of the change ($\Delta HA_i$) is not greater than the fifth threshold (AH5), the methodology can proceed to block 290 where the methodology can calculate the filtered heading angle ($FH_i$) according to the formula:

$$FH_i = FH_{(i-1)} + (\Delta HA_i \times AF6)$$

where AF6 is a sixth angle filter and can be set to a predetermined value, such as (1/64). In the particular example provided, the sixth angle filter can be a value that is less than a predetermined hysteresis angle that is associated with the electronic compass 10 so as to prevent or reduce the occurrence of jitter. The methodology can then progress to block 100.

Returning to FIG. 1, the controller 16 can employ the current value of the filtered heading ($FH_i$) to determine the heading output, which is transmitted to the display 22. As noted above, the heading output may be a signal that is indicative of a numeric heading value and/or of a heading direction.

Figure 3:
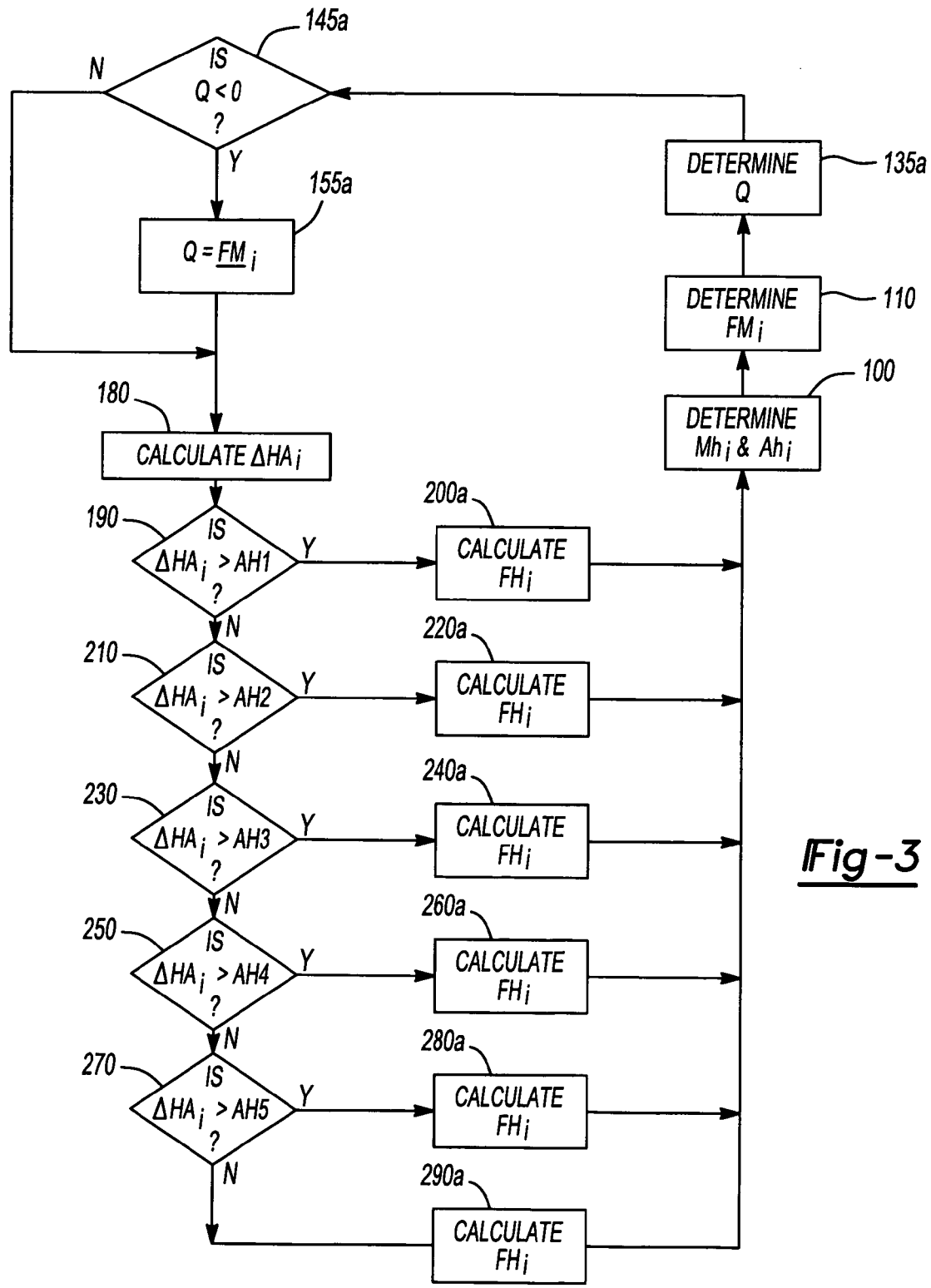
FIG. 3 is a schematic illustration in flow-chart form illustrating the operation of another controller for an electronic compass constructed and operated in accordance with the teachings of the present invention.

While the teachings of the present invention have been discussed above in conjunction with a given methodology, those of ordinary skill in the art will appreciate that the invention, in its broadest aspects, may be carried out somewhat differently. In this regard, it will be appreciated that the magnitude of a magnetic field vector, such as the heading magnitude ($Mh_i$) or the filtered magnitude ($FM_i$), may be employed to determine a new value of the filtered heading angle ($FH_i$). Another example of a methodology performed in accordance with the teachings of the present invention is illustrated in FIG. 3. Some steps of the methodology can be identical to those that are illustrated in FIG. 2. Accordingly, identical reference numerals are employed to indicate an identical step (i.e., a step that is identical to that which is disclosed in conjunction with the methodology of FIG. 2).

With reference to FIG. 3, the methodology can progress from block 110 to block 135a where a value (Q) indicative of total error may be calculated. The value (Q) can be calculated from the formula:

$$Q = 1 - G \times \frac{|Mh_i - FM_i|}{FM_i}$$

where the value (G) can represent a quality gain value and can be set to a predetermined value, such as 0.4. The methodology can then proceed to decision block 145a, where the methodology determines if the value (Q) is less than the lowest quality factor. If the value (Q) is less than the lowest quality factor, which can be 1/64, the methodology can progress to block 155a where the value (Q) is set to the lowest quality factor. The methodology can then progress to block 180 and thereafter decision block 190. Returning to decision block 145a, if the value (Q) is not less than the lowest quality factor, the methodology can progress to block 180 and thereafter decision block 190.

If the magnitude of the change ($\Delta HA_i$) is greater than the first threshold (AH1) in decision block 190, the methodology proceeds to block 200s, where the filtered heading angle ($FH_i$) can be calculated according to the formula:

$$FH_i = FH_{(i-1)} + (\Delta HA_i \times AF1 \times Q)$$

where AF1 is a first angle filter and can be set to a predetermined value, such as (16/64). The methodology can then progress to block 100.

Returning to decision block 190, if the magnitude of the change ($\Delta HA_i$) is not greater than the first threshold (AH1), the methodology can proceed to decision block 210. If the magnitude of the change ($\Delta HA_i$) is greater than the second threshold (AH2), the methodology proceeds to block 220a, where the filtered heading angle ($FH_i$) can be calculated according to the formula:

$$FH_i = FH_{(i-1)} + (\Delta HA_i \times AF2 \times Q)$$

where AF2 is a second angle filter and can be set to a predetermined value, such as (18/64). The methodology can then progress to block 100.

Returning to decision block 210, if the magnitude of the change ($\Delta HA_i$) is not greater than the second threshold (AH2), the methodology can proceed to decision block 230. If the magnitude of the change ($\Delta HA_i$) is greater than the third threshold (AH3), the methodology proceeds to block 240, where the filtered heading angle ($FH_i$) can be calculated according to the formula:

$$FH_i = FH_{(i-1)} + (\Delta HA_i \times AF3 \times Q)$$

where AF3 is a third angle filter and can be set to a predetermined value, such as (12/64). The methodology can then progress to block 100.

Returning to decision block 230, if the magnitude of the change ($\Delta HA_i$) is not greater than the third threshold (AH3), the methodology can proceed to decision block 250. If the magnitude of the change ($\Delta HA_i$) is greater than the fourth threshold (AH4), the methodology proceeds to block 260a, where the filtered heading angle ($FH_i$) can be calculated according to the formula:

$$FH_i = FH_{(i-1)} + (\Delta HA_i \times AF4 \times Q)$$

where AF4 is a fourth angle filter and can be set to a predetermined value, such as (8/64). The methodology can then progress to block 100.

Returning to decision block 250, if the magnitude of the change ($\Delta HA_i$) is not greater than the fourth threshold (AH4), the methodology can proceed to decision block 270. If the magnitude of the change ($\Delta HA_i$) is greater than the fifth threshold (AH5), the methodology proceeds to block 280a, where the filtered heading angle ($FH_i$) can be calculated according to the formula:

$$FH_i = FH_{(i-1)} + (\Delta HA_i \times AF5 \times Q)$$

where AF5 is a fifth angle filter and can be set to a predetermined value, such as (4/64). The methodology can then progress to block 100.

Returning to decision block 270, if the magnitude of the change ($\Delta HA_i$) is not greater than the fifth threshold (AH5), the methodology can proceed to block 290a where the methodology can calculate the filtered heading angle ($FH_i$) according to the formula:

$$FH_i = FH_{(i-1)} + (\Delta HA_i \times AF6 \times Q)$$

where AF6 is a sixth angle filter and can be set to a predetermined value, such as (1/64). The methodology can then progress to block 100.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method comprising:
    determining a first parameter based at least upon a heading magnitude ($Mh_i$);
    determining a second parameter based at least upon an angle heading ($Ah_i$);
    if the first parameter is greater than a positive filter threshold or less than a negative filter threshold, setting a timer to a predetermined timer value;
    if a current value of the timer is greater than zero, determining a filtered heading based at least partially upon the current value of the timer; and
    if the current value of the timer is equal to zero, determining the filtered heading based at least partially upon the second parameter and a filter algorithm selected on a basis of a magnitude of the second parameter.

2. The method of claim 1, wherein if the magnitude of the second parameter is less than or equal to a first heading threshold, the filter algorithm changes the filtered heading by an amount that is less than a predetermined hysteresis angle.

3. The method of claim 2, wherein if the magnitude of the second parameter is greater than the first heading threshold and less than a second heading threshold, the filter algorithm changes the filtered heading by a constant.

4. The method of claim 3, wherein if the magnitude of the second parameter is greater than the first heading threshold and less than a first intermediate heading threshold, the constant is equal to a first predetermined value.

5. The method of claim 4, wherein if the magnitude of the second parameter is not less than the first intermediate heading threshold and is less than a second intermediate heading threshold, the constant is equal to a second predetermined value and wherein if the magnitude of the second parameter is not less than the second intermediate heading threshold and is less than the second heading threshold, the constant is equal to a third predetermined value, wherein the first predetermined value is less than the second predetermined value and wherein the second predetermined value is less than the third predetermined value.

6. The method of claim 3, wherein if the magnitude of the second parameter is not less than the second heading threshold, the filter algorithm changes the heading angle by a fraction of the magnitude of the second parameter.

7. The method of claim 6, wherein a magnitude of the fraction is based on the magnitude of the second parameter.

8. The method of claim 1, wherein the first parameter is equal to $$Mh_i + FM_{(i-1)} - \frac{FM_{(i-1)}}{2^L}$$

where L is a predetermined constant, $FM_n$ is a previous value of the first value and $Mh_i$ is calculated according to the formula:

$$\sqrt{(X_i - X_c)^2 + (Y_i + Y_c)^2}$$

where Xn is an X component of a magnetic field vector, Yn is a Y component of the magnetic field vector, Xc is an X calibration factor, and Yc is a Y calibration factor.

9. The method of claim 1, wherein the second parameter is equal to:

$$Ah_i - FH_{(i-1)}$$

where $FH_{(i-1)}$ is a previous value of the filtered heading.

10. A method for determining a compass heading comprising:
    determining a difference between an angle parameter of a magnetic field vector and a prior value of the compass heading; and
    selecting an algorithm for determining the compass heading based upon a difference between the angle parameter of the magnetic field vector and the prior value of the compass heading.

11. The method of claim 10, wherein if the magnitude of the difference is less than or equal to a first heading threshold, the algorithm determines the compass heading by changing a previous value of the compass heading by an amount that is less than a predetermined hysteresis angle.

12. The method of claim 11, wherein if the magnitude of the difference is greater than the first heading threshold and less than a second heading threshold, the algorithm determines the compass heading by changing a previous value of the compass heading by a constant.

13. The method of claim 12, wherein if the magnitude of the difference is greater than the first heading threshold and less than a first intermediate heading threshold, the constant is equal to a first predetermined value.

14. The method of claim 13, wherein if the magnitude of the difference is not less than the first intermediate heading threshold and is less than a second intermediate heading threshold, the constant is equal to a second predetermined value and wherein if the magnitude of the difference is not less than the second intermediate heading threshold and is less than the second heading threshold, the constant is equal to a third predetermined value, wherein the first predetermined value is less than the second predetermined value and wherein the second predetermined value is less than the third predetermined value.

15. The method of claim 12, wherein if the magnitude of the difference is not less than the second heading threshold, the filter algorithm changes the heading angle by a fraction of the magnitude of the difference.

16. The method of claim 15, wherein a magnitude of the faction is based on the magnitude of the difference.

17. The method of claim 10, wherein prior to determining the difference, the methodology determines if a magnitude of a filtered magnitude variable is out-of-bounds.

18. The method of claim 17, wherein if the magnitude of the filtered magnitude variable is out-of-bounds, the methodology selects an algorithm for determining the compass heading based upon an amount of time that the magnitude of the filtered magnitude variable has been out-of-bounds.

19. A method comprising:
determining a magnitude of a magnetic field vector; and
determining a filtered compass heading at least partially based upon the magnitude of the magnetic field vector;
wherein determining the filtered compass heading further comprises:
setting a timer to a predetermined value if the magnitude of the predetermined variable is out-of-bounds; and
selecting an algorithm for calculating the filtered compass heading based on a value of the timer.

20. The method of claim 19, wherein if the value of the timer is less than or equal to a predetermined threshold, the method further comprises selecting an algorithm for determining the filtered compass heading based upon a difference between an angle parameter of the magnetic field vector and a prior value of the filtered compass heading.

21. A method comprising:
determining a magnitude of a magnetic field vector; and
determining a filtered compass heading at least partially based upon the magnitude of the magnetic field vector;
wherein determining the filtered compass heading comprises determining a compensation coefficient based at least partially on the magnetic field vector.

22. The method of claim 21, wherein determining the filtered compass heading further comprises:
determining a difference between an angle parameter of the magnetic field vector and a prior value of the filtered compass heading; and
selecting an algorithm for determining the filtered compass heading based upon a difference between the angle parameter and the prior value of the compass heading.

* * * * *